UNITED STATES PATENT OFFICE.

ENGELBERT BERGS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCTION OF CAMPHENE.

No. 833,666.

Specification of Letters Patent.

Patented Oct. 16, 1906.

Application filed July 30, 1906. Serial No. 328,450.

*To all whom it may concern:*

Be it known that I, ENGELBERT BERGS, doctor of philosophy and chemist, a subject of the King of Prussia, German Emperor, residing at Ludwigshafen-on-the-Rhine, Germany, have invented new and useful Improvements in the Production of Camphene, of which the following is a specification.

The preparation of camphene by melting pinene hydrochlorid with alkali phenolate has been described by Reychler in the *Bulletin de la Société Chimique de Paris*, (3,) 15, 371, and in the *Berichte*, vol. 29, 696. In the method therein described, however, the alkali phenolate used is free or practically free from water, the author stating that before introducing the pinene hydrochlorid the alkali phenolate is to be heated to a temperature of 175° centigrade in order to remove the water.

I have now discovered that the manufacture of camphene from pinene hydrochlorid can be carried out much more easily by heating the pinene hydrochlorid with an aqueous solution of an alkali phenolate.

The present process possesses many advantages over the process described in the above references. In particular the tedious operation of preparing alkali phenolate in the dry form is dispensed with, it being only necessary to dissolve the phenol in aqueous caustic alkali solution and then to introduce the pinene hydrochlorid and to heat the mixture. After the reaction has taken place excess of alkali is preferably added, and the camphene formed is distilled off by means of steam, whereupon the solution of alkali phenolate which remains behind can, after the addition of phenol to fix the excess of alkali, and, if necessary, after evaporating down to the required concentration, be employed directly to react upon a fresh quantity of pinene hydrochlorid. This constitutes a further advantage over Reychler's process, for when pinene hydrochlorid is melted with dry alkali phenolate a more or less darkly-colored reaction product is obtained, a part of the phenol being destroyed and the remainder of the phenol has to be purified before it can conveniently be used over again.

I prefer to carry out the reaction in the presence of an excess of phenol over that necessary to combine with all of the alkali used.

Instead of the simplest phenol ($C_6H_5OH$) other phenols—such, for instance, as orthocresol or alpha-naphthol or beta-naphthol—can be employed, and I include all these compounds under the generic term "phenol."

The following examples will serve to further illustrate the nature of my invention and the method of carrying it into practical effect; but my invention is not confined to these examples. The parts are by weight.

Example 1: Mix together one thousand (1,000) parts of solid pinene hydrochlorid, nine hundred (900) parts of phenol, two hundred and thirty (230) parts of caustic soda, and six hundred (600) parts of water and heat the mixture in an autoclave while stirring for from five (5) to six (6) hours at a temperature of one hundred and sixty (160°) degrees centigrade. When the mixture is cool, pour off the liquid from the sodium chlorid which has crystallized out, add excess of caustic soda to the liquid, and distil off the camphene by means of steam.

Example 2: Mix together one thousand (1,000) parts of solid pinene hydrochlorid, one thousand (1,000) parts of orthocresol, two hundred and forty (240) parts of caustic soda, and eight hundred (800) parts of water and treat the mixture in the manner described in the foregoing Example 1.

Example 3: Mix together one thousand (1,000) parts of solid pinene hydrochlorid, eleven hundred (1,100) parts of alpha-naphthol, two hundred and forty (240) parts of caustic soda, and about eight hundred (800) parts of water and treat the mixture in the manner described in the foregoing Example 1. In this example beta-naphthol can be used instead of alpha-naphthol.

In all of the above examples the quantity of water employed can be varied within considerably large ranges.

I claim—

1. The process of producing camphene by heating pinene hydrochlorid with an aqueous solution of an alkali salt of a phenol whereby the use of steam distillation is rendered possible and the decomposition of the residue is obviated.

2. The process of producing camphene by heating pinene hydrochlorid with an aqueous solution of sodium phenolate ($C_6H_5ONa$) whereby the use of steam distillation is rendered possible and the decomposition of the residue is obviated.

3. The process of producing camphene by heating pinene hydrochlorid with an aqueous solution of sodium phenolate ($C_6H_5ONa$) in the presence of an excess of phenol ($C_6H_5OH$) whereby the use of steam distillation is rendered possible and the decomposition of the residue is obviated.

In testimony whereof I have hereunto set my hand in the presence of two subscribing witnesses.

ENGELBERT BERGS.

Witnesses:
J. ALEC. LLOYD,
H. W. HARRIS.